US012150486B2

(12) United States Patent
Talon

(10) Patent No.: US 12,150,486 B2
(45) Date of Patent: *Nov. 26, 2024

(54) AEROSOL GENERATING DEVICE WITH AIR FLOW DETECTION

(71) Applicant: Philip Morris Products S.A., Neuchatel (CH)

(72) Inventor: Pascal Talon, Thonon-les-Bains (FR)

(73) Assignee: Philip Morris Products S.A., Neuchatel (CH)

( * ) Notice: Subject to any disclaimer, the term of this patent is extended or adjusted under 35 U.S.C. 154(b) by 243 days.

This patent is subject to a terminal disclaimer.

(21) Appl. No.: 17/844,504

(22) Filed: Jun. 20, 2022

(65) Prior Publication Data

US 2022/0322746 A1 Oct. 13, 2022

Related U.S. Application Data

(60) Division of application No. 16/871,969, filed on May 11, 2020, now Pat. No. 11,395,515, which is a (Continued)

(30) Foreign Application Priority Data

Dec. 30, 2011 (EP) ..................................... 11196240
Apr. 2, 2012 (EP) ..................................... 12162894

(51) Int. Cl.
*A24F 47/00* (2020.01)
*A24F 40/50* (2020.01)
(Continued)

(52) U.S. Cl.
CPC ........... *A24F 40/50* (2020.01); *H05B 1/0244* (2013.01); *A24F 40/20* (2020.01)

(58) Field of Classification Search
CPC ................................ A24F 40/50; A24F 40/57
See application file for complete search history.

(56) References Cited

U.S. PATENT DOCUMENTS

| | | | |
|---|---|---|---|
| 5,144,962 | A | 9/1992 | Counts |
| 6,124,574 | A | 9/2000 | Knepler |

(Continued)

FOREIGN PATENT DOCUMENTS

| | | | |
|---|---|---|---|
| CN | 1694765 | A | 11/2005 |
| CN | 101557728 | A | 10/2009 |

(Continued)

OTHER PUBLICATIONS

Korean Office Action issued Feb. 10, 2023 in Korean Patent Application No. 10-2022-7016844 (with English language translation), 8 pages.

(Continued)

*Primary Examiner* — Eric Yaary
(74) *Attorney, Agent, or Firm* — Oblon, McClelland, Maier & Neustadt, L.L.P.

(57) ABSTRACT

An aerosol-generating device is provided, including: a heater element; a power source; and a controller configured to control a power supplied from the power source to the heater element to maintain a temperature of the heater element at a target temperature, and adjust the target temperature when a change in airflow past the heater element is detected. An aerosol-generating system including the aerosol-generating device, and a method of controlling an aerosol-generating device, are also provided.

20 Claims, 3 Drawing Sheets

Related U.S. Application Data continuation of application No. 16/171,552, filed on Oct. 26, 2018, now Pat. No. 10,674,770, which is a continuation of application No. 14/361,178, filed as application No. PCT/EP2012/077064 on Dec. 28, 2012, now Pat. No. 10,143,232.

(51) Int. Cl.
*H05B 1/02* (2006.01)
*A24F 40/20* (2020.01)

(56) References Cited

U.S. PATENT DOCUMENTS

| | | | |
|---|---|---|---|
| 10,143,232 B2 | 12/2018 | Talon | |
| 10,674,770 B2 | 6/2020 | Talon | |
| 2002/0079309 A1 | 6/2002 | Cox et al. | |
| 2003/0033055 A1 | 2/2003 | Mcrae et al. | |
| 2003/0150451 A1 | 8/2003 | Shayan | |
| 2004/0089314 A1 | 5/2004 | Felter et al. | |
| 2004/0200488 A1 | 10/2004 | Felter et al. | |
| 2007/0047931 A1 | 3/2007 | Niemeyer | |
| 2007/0074734 A1 | 4/2007 | Braunshteyn | |
| 2008/0092912 A1 | 4/2008 | Robinson | |
| 2008/0149118 A1 | 6/2008 | Oglesby et al. | |
| 2009/0001070 A1 | 1/2009 | Scott | |
| 2009/0095312 A1 | 4/2009 | Herbrich | |
| 2009/0133691 A1 | 5/2009 | Yamada et al. | |
| 2009/0189420 A1 | 7/2009 | Bohlender | |
| 2009/0223514 A1 | 9/2009 | Smith et al. | |
| 2009/0230117 A1 | 9/2009 | Fernando | |
| 2010/0024816 A1 | 2/2010 | Weinstein | |
| 2010/0307518 A1 | 12/2010 | Wang | |
| 2010/0313901 A1 | 12/2010 | Fernando et al. | |
| 2011/0036346 A1 | 2/2011 | Cohen | |
| 2011/0041858 A1 | 2/2011 | Montaser | |
| 2011/0155718 A1 | 6/2011 | Greim | |
| 2011/0186560 A1 | 8/2011 | Kennedy | |
| 2011/0265806 A1 * | 11/2011 | Alarcon | A24F 40/485 131/273 |
| 2012/0291779 A1 | 11/2012 | Haartsen | |
| 2012/0295141 A1 | 11/2012 | Allen | |

FOREIGN PATENT DOCUMENTS

| | | |
|---|---|---|
| CN | 101977522 A | 2/2011 |
| CN | 102088875 A | 6/2011 |
| DE | 10 2007 011 120 A1 | 9/2008 |
| EA | 200802045 A1 | 2/2009 |
| EP | 1 989 946 | 11/2008 |
| EP | 2110033 A1 | 10/2009 |
| EP | 2143346 A1 | 1/2010 |
| EP | 2 257195 A1 | 12/2010 |
| EP | 2 432339 A1 | 3/2012 |
| JP | 2-124082 A | 5/1990 |
| JP | 3-232481 A | 10/1991 |
| JP | 7-231938 A | 9/1995 |
| JP | H11-503912 A | 4/1999 |
| JP | 2000-41654 | 2/2000 |
| JP | 2002-519120 A1 | 7/2002 |
| JP | 2005-34021 A | 2/2005 |
| JP | 2005-538159 A | 12/2005 |
| JP | 2008-539890 A | 11/2008 |
| JP | WO 2009/069518 A1 | 6/2009 |
| JP | 2009-172392 A | 8/2009 |
| JP | 2010-526553 A | 8/2010 |
| JP | 2011-505874 A | 3/2011 |
| JP | 2011-515093 A | 5/2011 |
| JP | 4869927 B2 | 11/2011 |
| JP | 5041550 B2 | 7/2012 |
| JP | 5196672 B2 | 2/2013 |
| JP | 2013-516265 A | 5/2013 |
| JP | 2013-521860 A | 6/2013 |
| KR | 10-1996-0702734 | 5/1996 |
| KR | 10-1999-0072214 A | 9/1999 |
| KR | 10-2008-0059587 A | 6/2008 |
| KR | 10-2010-0127817 A | 12/2010 |
| KR | 10-2011-0025186 | 3/2011 |
| RU | 2328192 C1 | 7/2008 |
| RU | 110608 U1 | 11/2011 |
| WO | WO 2008/015918 A1 | 2/2008 |
| WO | 2009 118085 | 10/2009 |
| WO | WO 2011/089486 A1 | 7/2011 |
| WO | WO 2011/089490 A1 | 7/2011 |

OTHER PUBLICATIONS

Office Action issued on Jun. 27, 2018 in Korean Application No. 10-2017-7001969 (English translation only).

English translation of Notice of Allowance issued Aug. 8, 2017 in Korean Application No. 10-2014-7010985.

Chinese Office Action, English only, dated May 24, 2017 in corresponding Chinese Application No. 201280060087.0, (10 pages).

English translation only of Korean Office Action issued on Dec. 19, 2017 in corresponding Korean Application No. 10-2017-7001969.

Communication of a notice of opposition issued Apr. 28, 2017 in European Patent Application No. 12818999.0.

Decision to Grant issued Feb. 14, 2017 in Russian Patent Application No. 2014131459/12(050494) (English translation only).

English translation only of Decision to Grant dispatched on Nov. 14, 2016 in corresponding Japanese Patent Application No. 2014-549491, (4 pages).

Combined Chinese Office Action and Search Report issued May 19, 2016 in Patent Application No.201280060087.0 (English Translation only).

Office Action issued Apr. 7, 2016 in Korean Patent Application No. 10-2014-7010985 (submitting English translation only).

Office Action issued Feb. 3, 2016 in Japanese Patent Application No. 2014-549491 (with English language translation).

Extended European Search Report issued Jun. 1, 2012 in Patent Application No. 11196240.3.

International Preliminary Report on Patentability and Written Opinion issued Jul. 10, 2014 in PCT/EP2012/077064.

Written Opinion of the International Searching Authority Issued Jan. 7, 2013 in PCT/EP12/077064 Filed Dec. 28, 2012.

International Search Report Issued Jan. 7, 2013 in PCT/EP12/077064 Filed Dec. 28, 2012.

Combined Chinese Office Action and Search Report issued Oct. 19, 2015 in Patent Application No. 201280060087.0 (with English translation of categories of cited documents).

M. Guslandi, "Nicotine treatment for ulcerative colitis" Clinical Pharmacology 48, 1999, pp. 481-484.

Korean Office Action issued on Jul. 5, 2019, in Patent Application No. 10-2019-7017726, 2 pages.

Office Action issued Dec. 4, 2019 in Korean Application No. 10-2019-7029393, along with an English translation.

Korean Office Action issued Jun. 26, 2020 in Korean Patent Application No. 10-2019-7029393 (with English language translation), 9 pages.

Notice of Allowance issued Dec. 24, 2020 in Korean Patent Application No. 10-2019-7029393 (with English translation), 6 pages.

Korean Office Action issued Feb. 22, 2024 in Korean Patent Application No. 10-2024-7001349 (with English Translation), 10 pages.

U.S. Appl. No. 16/871,969, filed May 11, 2020, 2020/0305508 A1, Pascal Talon.

* cited by examiner

AEROSOL GENERATING DEVICE WITH AIR FLOW DETECTION

CROSS-REFERENCE TO RELATED APPLICATIONS

This application is a divisional of and claims benefit under 35 U.S.C. § 120 to U.S. application Ser. No. 16/871,969, filed May 11, 2020, which is a continuation of and claims benefit under 35 U.S.C. § 120 to U.S. application Ser. No. 16/171,552, filed Oct. 26, 2018 (now U.S. Pat. No. 10,674,770), which is a continuation of and claims benefit under 35 U.S.C. § 120 to U.S. application Ser. No. 14/361,178 (now U.S. Pat. No. 10,143,232), filed May 28, 2014, which is a U.S. National Stage application of PCT/EP2012/077064, filed on Dec. 28, 2012, which is based upon and claims the benefit of priority under 35 U.S.C. § 119 to European Patent Application No. 12162894.5, filed Apr. 2, 2012, and European Patent Application No. 11196240.3, filed Dec. 30, 2011, each of these documents being incorporated herein by reference in their entireties.

TECHNICAL FIELD

This specification relates to aerosol generating systems and in particular to aerosol generating devices for user inhalation, such as smoking devices. The specification relates to a device and method for detecting changes in air flow through an aerosol generating device, typically corresponding to a user inhalation or puff, in a cost effective and reliable way.

DESCRIPTION OF THE RELATED ART

Conventional lit end cigarettes deliver smoke as a result of combustion of the tobacco and a wrapper which occurs at temperatures which may exceed 800 degrees Celsius during a puff. At these temperatures, the tobacco is thermally degraded by pyrolysis and combustion. The heat of combustion releases and generates various gaseous combustion products and distillates from the tobacco. The products are drawn through the cigarette and cool and condense to form a smoke containing the tastes and aromas associated with smoking. At combustion temperatures, not only tastes and aromas are generated but also a number of undesirable compounds.

Electrically heated smoking devices are known, which are essentially aerosol generating systems, which operate at lower temperatures than conventional lit end cigarettes. An example of such an electrical smoking device is disclosed in WO2009/118085.

WO2009/118085 discloses an electrical smoking system in which an aerosol-forming substrate is heated by a heater element to generate an aerosol. The temperature of the heater element is controlled to be within a particular range of temperatures in order to ensure that undesirable volatile compounds are not generated and released from the substrate while other, desired volatile compounds are released.

It is desirable to provide a puff detection function in an aerosol generating device in an inexpensive and reliable manner. Puff detection is useful, for example, both for dynamic control of a heater element within the system and for analytical purposes.

SUMMARY

In an aspect of the specification, there is provided an aerosol generating device configured to user inhalation of a generated aerosol, the device comprising: a heater element configured to heat an aerosol-forming substrate; a power source connected to the heater element; and a controller connected to the heater element and to the power source, wherein the controller is configured to control the power supplied to the heater element from the power source to maintain the temperature of the heater element at a target temperature, and is configured to monitor changes in the temperature of the heater element or changes in the power supplied to the heater element to detect a change in air flow past the heater element indicative of a user inhalation.

BRIEF DESCRIPTION OF THE DRAWINGS

Examples will now be described in detail with reference to the accompanying drawings, in which.

DETAILED DESCRIPTION

Figure 1:
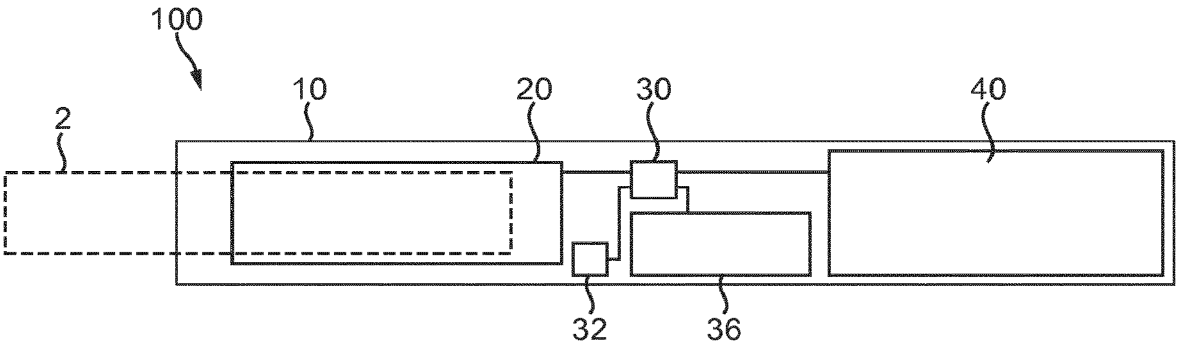
FIG. 1 is a schematic drawing showing the basic elements of an aerosol generating device in accordance with one embodiment.

As used herein, an 'aerosol-generating device' relates to a device that interacts with an aerosol-forming substrate to generate an aerosol. The aerosol-forming substrate may be part of an aerosol-generating article, for example part of a smoking article. An aerosol-generating device may be a smoking device that interacts with an aerosol-forming substrate of an aerosol-generating article to generate an aerosol that is directly inhalable into a user's lungs thorough the users mouth. An aerosol-generating device may be a holder.

As used herein, the term 'aerosol-forming substrate' relates to a substrate capable of releasing volatile compounds that can form an aerosol. Such volatile compounds may be released by heating the aerosol-forming substrate. An aerosol-forming substrate may conveniently be part of an aerosol-generating article or smoking article.

As used herein, the terms 'aerosol-generating article' and 'smoking article' refer to an article comprising an aerosol-forming substrate that is capable of releasing volatile compounds that can form an aerosol. For example, an aerosol-generating article may be a smoking article that generates an aerosol that is directly inhalable into a user's lungs through the users mouth. An aerosol-generating article may be disposable. The term 'smoking article' is generally used hereafter. A smoking article may be, or may comprise, a tobacco stick.

As used herein, the term "inhalation" is intended to mean the action of a user drawing an aerosol into their body through their mouth or nose. Inhalation includes the situation where an aerosol is drawn into the user's lungs, and also the situation where an aerosol is only drawn into the user's mouth or nasal cavity before being expelled from the user's body.

The controller may comprise a programmable microprocessor. In another embodiment, the controller may comprise a dedicated electronic chip such as a field programmable gate array (FPGA) or an application specific integrated circuit (ASIC). In general, any device capable of providing a signal capable of controlling a heater element may be used consistent with the embodiments discussed herein. In one embodiment the controller is configured to monitor a difference between the temperature of the heater element and the target temperature to detect a change in air flow past the heater element indicative of a user inhalation.

The specification provides for detection of changes in airflow through an aerosol generating device, and in particular detection of user inhalations or puffs, without requiring a dedicated air flow sensor. This reduces the cost and complexity of providing for detection of user inhalation as compared with existing devices that include a dedicated air flow sensor, and increases reliability as there are fewer components that can potentially fail.

In one embodiment, the controller may be configured to monitor if a difference between the temperature of the heater element and the target temperature exceeds a threshold in order to detect a change in air flow past the heater element indicative of a user inhalation. The controller may be configured to monitor whether a difference between the temperature of the heater element and the target temperature exceeds a threshold for a predetermined time period or for a predetermined number of measurement cycles to detect a change in air flow past the heater element indicative of a user inhalation. This ensures that very short term fluctuations in temperature do not lead to false detection of a user inhalation.

In another embodiment the controller may be configured to monitor a difference between the power supplied to the heater element and an expected power level to detect a change in air flow past the heater element indicative of a user inhalation. Alternatively, or in addition, the controller may be configured to compare a rate of change of temperature, or a rate of change of power supplied, with a threshold level to detect a change in air flow past the heater element indicative of a user inhalation.

The controller may be configured to adjust the target temperature when a change in airflow past the heater is detected. Increased airflow brings more oxygen into contact with the substrate. This increases the likelihood of combustion of the substrate at a given temperature. Combustion of the substrate is undesirable. So the target temperature may be lowered when an increase in airflow is detected in order to reduce the likelihood of combustion of the substrate. Alternatively, or in addition, the controller may be configured to adjust the power supplied to the heater element when a change in airflow past the heater element is detected. Airflow past the heater element typically has a cooling effect on the heater element. The power to the heater element may be temporarily increased to compensate for this cooling.

The power source may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate or a Lithium-Polymer battery. Power may be supplied to the heater element as a pulsed signal. The amount of power delivered to the heater element may be adjusted by altering the duty cycle or the pulse width of the power signal.

In one embodiment, the controller may be configured to monitor the temperature of the heater element based on a measure of the electrical resistance of the heater element. This allows the temperature of the heater element to be detected without the need for additional sensing hardware.

The temperature of the heater may be monitored at predetermined time intervals, such as every few milliseconds. This may be done continuously or only during periods when power is being supplied to the heater element.

The controller may be configured to reset, ready to detect the next user puff when the difference between the detected temperature and the target temperature is less than a threshold amount. The controller may be configured to require that the difference between the detected temperature and the target temperature is less than a threshold amount for a predetermined time or number of measurement cycles.

The controller may include a memory. The memory may be configured to record the detected changes in airflow or user puffs. The memory may record a count of user puffs or the time of each puff. The memory may also be configured to record the temperature of the heater element and the power supplied during each puff. The memory may record any available data from the controller, as desired.

This user puff may be useful for subsequent clinical studies, as well as device maintenance and design. The user puff data may be transferred to an external memory or processing device by any suitable data output means. For example the aerosol generating device may include a wireless radio connected to the controller or memory or a universal serial bus (USB) socket connected to the controller or memory. Alternatively, the aerosol generating device may be configured to transfer data from the memory to an external memory in a battery charging device every time the aerosol generating device is recharged through suitable data connections.

The device may be an electrical smoking device. The aerosol-generating device may be an electrically heated smoking device comprising an electric heater. The term "electric heater" refers to one or more electric heater elements.

The electric heater may comprise a single heater element. Alternatively, the electric heater may comprise more than one heater element. The heater element or heater elements may be arranged appropriately so as to most effectively heat the aerosol-forming substrate.

The electric heater element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required. Ceramic and/or insulating materials may include, for example, aluminium oxide or zirconia oxide ($ZrO_2$). Alternatively, the electric heater may comprise an infra-red heater element, a photonic source, or an inductive heater element.

The electric heater element may take any suitable form. For example, the electric heater element may take the form of a heating blade. Alternatively, the electric heater element may take the form of a casing or substrate having different electro-conductive portions, or an electrically resistive metallic tube. Alternatively, one or more heating needles or rods that run through the centre of the aerosol-forming substrate may be as already described. Alternatively, the electric heater element may be a disk (end) heater or a combination of a disk heater with heating needles or rods. Other alternatives include a heating wire or filament, for example a Ni—Cr (Nickel-Chromium), platinum, gold, silver, tungsten or alloy wire or a heating plate. Optionally, the heater element may be deposited in or on a rigid carrier material. In one such embodiment, the electrically resistive heater element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heaters during operation.

The electric heater may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. In one embodiment, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy.

The heat sink or heat reservoir may be arranged such that it is directly in contact with the aerosol-forming substrate and can transfer the stored heat directly to the substrate. Alternatively, the heat stored in the heat sink or heat reservoir may be transferred to the aerosol-forming substrate by means of a thermal conductor, such as a metallic tube.

The electric heater element may heat the aerosol-forming substrate by means of conduction. The electric heater element may be at least partially in contact with the substrate, or the carrier on which the substrate is deposited. Alternatively, the heat from the electric heater element may be conducted to the substrate by means of a heat conductive element.

Alternatively, the electric heater element may transfer heat to the incoming ambient air that is drawn through the electrically heated smoking system during use, which in turn heats the aerosol-forming substrate by convection. The ambient air may be heated before passing through the aerosol-forming substrate.

In one embodiment, power is supplied to the electric heater until the heater element or elements of the electric heater reach a temperature of between approximately 250° C. and 440° C. in order to produce an aerosol from the aerosol-forming substrate. Any suitable temperature sensor and control circuitry may be used in order to control heating of the heater element or elements to reach the temperature of between approximately 250° C. and 440° C., including the use of one or more heaters. This is in contrast to conventional cigarettes in which the combustion of tobacco and cigarette wrapper may reach 800° C.

The aerosol-forming substrate may be contained in a smoking article. During operation, the smoking article containing the aerosol-forming substrate may be completely contained within the aerosol-generating device. In that case, a user may puff on a mouthpiece of the aerosol-generating device. A mouthpiece may be any portion of the aerosol-generating device that is placed into a user's mouth in order to directly inhale an aerosol generated by the aerosol-generating article or aerosol-generating device. The aerosol is conveyed to the user's mouth through the mouthpiece. Alternatively, during operation the smoking article containing the aerosol-forming substrate may be partially contained within the aerosol-generating device. In that case, the user may puff directly on a mouthpiece of the smoking article.

The smoking article may be substantially cylindrical in shape. The smoking article may be substantially elongate. The smoking article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length. The aerosol-forming substrate may be received in the sliding receptacle of the aerosol-generating device such that the length of the aerosol-forming substrate is substantially parallel to the airflow direction in the aerosol generating device.

The smoking article may have a total length between approximately 30 mm and approximately 100 mm. The smoking article may have an external diameter between approximately 5 mm and approximately 12 mm. The smoking article may comprise a filter plug. The filter plug may be located at the downstream end of the smoking article. The filter plug may be a cellulose acetate filter plug. The filter plug is approximately 7 mm in length in one embodiment, but may have a length of between approximately 5 mm to approximately 10 mm.

In one embodiment, the smoking article has a total length of approximately 45 mm. The smoking article may have an external diameter of approximately 7.2 mm. Further, the aerosol-forming substrate may have a length of approximately 10 mm. Alternatively, the aerosol-forming substrate may have a length of approximately 12 mm. Further, the diameter of the aerosol-forming substrate may be between approximately 5 mm and approximately 12 mm. The smoking article may comprise an outer paper wrapper. Further, the smoking article may comprise a separation between the aerosol-forming substrate and the filter plug. The separation may be approximately 18 mm, but may be in the range of approximately 5 mm to approximately 25 mm.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former that facilitates the formation of a dense and stable aerosol. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

As used herein, homogenised tobacco refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise comminuting one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

In a particularly preferred embodiment, the aerosol-forming substrate comprises a gathered crimpled sheet of homogenised tobacco material. As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article.

This advantageously facilitates gathering of the crimped sheet of homogenised tobacco material to form the aerosol-forming substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled. In certain embodiments, the aerosol-forming substrate may comprise a gathered sheet of homogenised tobacco material that is substantially evenly textured over substantially its entire surface. For example, the aerosol-forming substrate may comprise a gathered crimped sheet of homogenised tobacco material comprising a plurality of substantially parallel ridges or corrugations that are substantially evenly spaced-apart across the width of the sheet.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

Although reference is made to solid aerosol-forming substrates above, it will be clear to one of ordinary skill in the art that other forms of aerosol-forming substrate may be used with other embodiments. For example, the aerosol-forming substrate may be a liquid aerosol-forming substrate. If a liquid aerosol-forming substrate is provided, the aerosol-generating device preferably comprises means for retaining the liquid. For example, the liquid aerosol-forming substrate may be retained in a container. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a solid in combination with the liquid.

Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

The aerosol-generating device may still further comprise an air inlet. The aerosol-generating device may still further comprise an air outlet. The aerosol-generating device may still further comprise a condensation chamber for allowing the aerosol having the desired characteristics to form.

The aerosol-generating device is preferably a handheld aerosol-generating device that is comfortable for a user to hold between the fingers of a single hand. The aerosol-generating device may be substantially cylindrical in shape. The aerosol-generating device may have a polygonal cross section and a protruding button formed on one face: in this embodiment, the external diameter of the aerosol-generating device may be between about 12.7 mm and about 13.65 mm measured from a flat face to an opposing flat face; between about 13.4 mm and about 14.2 mm measured from an edge to an opposing edge (that is, from the intersection of two faces on one side of the aerosol-generating device to a corresponding intersection on the other side); and between about 14.2 mm and about 15 mm measured from a top of the button to an opposing bottom flat face. The length of the aerosol generating device may be between about 70 mm and 120 mm.

In another aspect of the specification, there is provided a method for detecting a user inhalation through an electrically heated aerosol generating device, the device comprising a heater element and a power supply for supplying power to the heater element, comprising: controlling power supplied to the heater element from the power source to maintain the heater element at a target temperature, and monitoring changes in the temperature of the heater element or changes in the power supplied to the heater element to detect a change in air flow past the heater element indicative of a user inhalation.

The step of monitoring may comprise monitoring a difference between the temperature of the heater element and the target temperature to detect a change in air flow past the heater element indicative of a user inhalation.

The method may further comprise the step of adjusting the target temperature when a change in air flow past the heater element indicative of a user inhalation is detected. As described, increased airflow brings more oxygen into contact with the substrate.

In another aspect of the specification, there is provided a computer program that when executed on a computer or other suitable processing device, carries out the method according to the another aspect described above. The specification includes embodiments that may be implemented as a software product suitable for running on an aerosol generating devices having a programmable controller as well as the other required hardware elements.

In FIG. 1, the inside of an embodiment of an aerosol-generating device 100 is shown in a simplified manner. Particularly, the elements of the aerosol-generating device 100 are not drawn to scale. Elements that are not relevant for the understanding of the embodiment discussed herein have been omitted to simplify FIG. 1.

The aerosol-generating device 100 comprises a housing 10 and an aerosol-forming substrate 2, for example a cigarette. The aerosol-forming substrate 2 is pushed inside the housing 10 to come into thermal proximity with the heater element 20. The aerosol-forming substrate 2 will release a range of volatile compounds at different temperatures. Some of the volatile compounds released from the aerosol-forming substrate 2 are only formed through the heating process. Each volatile compound will be released above a characteristic release temperature. By controlling the maximum operation temperature of the aerosol-generating device 100 to be below the release temperature of some of the volatile compounds, the release or formation of these smoke constituents can be avoided.

Additionally, the aerosol-generating device 100 includes an electrical energy supply 40, for example a rechargeable lithium ion battery, provided within the housing 10. The aerosol-generating device 100 further includes a controller 30 that is connected to the heater element 20, the electrical energy supply 40, an aerosol-forming substrate detector 32 and a user interface 36, for example a graphical display or a combination of LED indicator lights that convey information regarding device 100 to a user.

The aerosol-forming substrate detector 32 may detect the presence and identity of an aerosol-forming substrate 2 in thermal proximity with the heater element 20 and signals the presence of an aerosol-forming substrate 2 to the controller 30. The provision of a substrate detector is optional.

The controller 30 controls the user interface 36 to display system information, for example, battery power, temperature, status of aerosol-forming substrate 2, other messages or combinations thereof.

The controller 30 further controls the maximum operation temperature of the heater element 20. The temperature of the heater element can be detected by a dedicated temperature sensor. Alternatively, in another embodiment the temperature of the heater element is determined by monitoring its electrical resistivity. The electrical resistivity of a length of wire is dependent on its temperature. Resistivity ρ increases with increasing temperature. The actual resistivity ρ characteristic will vary depending on the exact composition of the alloy and the geometrical configuration of the heater element 20, and an empirically determined relationship can be used in the controller. Thus, knowledge of resistivity ρ at any given time can be used to deduce the actual operation temperature of the heater element 20.

The resistance of the heater element R=V/I; where V is the voltage across the heater element and I is the current passing through the heater element 20. The resistance R depends on the configuration of the heater element 20 as well as the temperature and is expressed by the following relationship:

$$R=\rho(T)*T/S \qquad \text{equation 1}$$

Where ρ(T) is the temperature dependent resistivity, L is length and S the cross-sectional area of the heater element 20. L and S are fixed for a given heater element 20 configuration and can be measured. Thus, for a given heater element design R is proportional to ρ(T).

The resistivity ρ(T) of the heater element can be expressed in polynomial form as follows:

$$\rho(T)=\rho_o*(1+\alpha_1+\alpha_2 T^2) \qquad \text{equation 2}$$

Where $\rho_o$ is the resistivity at a reference temperature $T_o$ and $\alpha_1$ and $\alpha_2$ are the polynominal coefficients.

Thus, knowing the length and cross-section of the heater element 20, it is possible to determine the resistance R, and therefore the resistivity ρ at a given temperature by measuring the heater element voltage V and current I. The temperature can be obtained simply from a look-up table of the characteristic resistivity versus temperature relationship for the heater element being used or by evaluating the polynomial of equation (2) above. In one embodiment, the process may be simplified by representing the resistivity ρ versus temperature curve in one or more, preferably two, linear approximations in the temperature range applicable to tobacco. This simplifies evaluation of temperature which is desirable in a controller 30 having limited computational resources.

Figure 2:
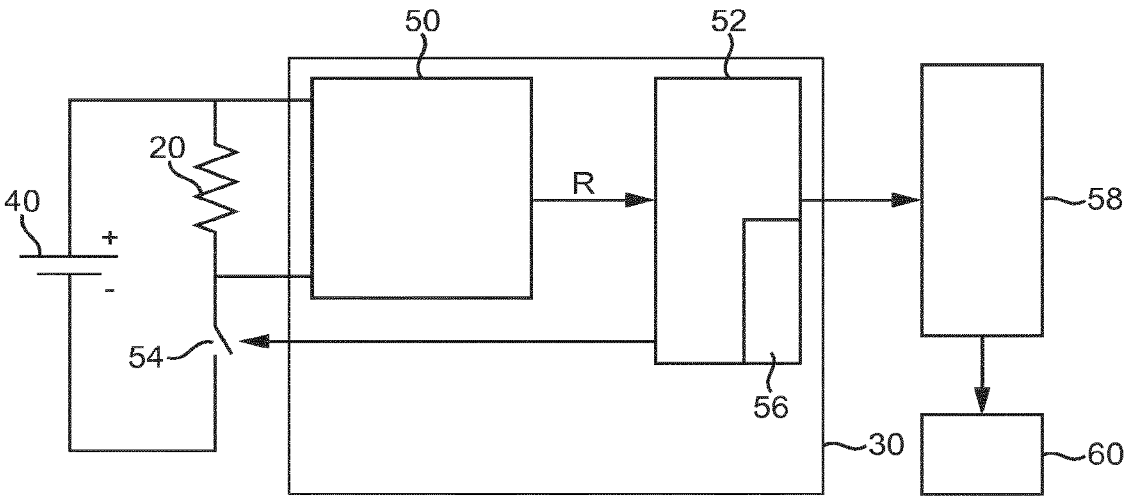
FIG. 2 is a schematic diagram illustrating the control elements of one embodiment.

FIG. 2 is a block diagram illustrating the control elements of the device of FIG. 1. FIG. 2 also illustrates the device being connected to one or more external devices 58, 60. The controller 30 includes a measurement unit 50 and a control unit 52. The measurement unit is configured to determine the resistance R of the heater element 20. The measurement unit 50 passes resistance measurements to the control unit 52. The control unit 52 then controls the provision of power from the battery 40 to the heater element 20 by toggling switch 54. The controller may comprise a microprocessor as well as separate electronic control circuitry. In one embodiment, the microprocessor may include standard functionality such as an internal clock in addition to other functionality.

In a preparation of the controlling of the temperature, a value for the target operation temperature of the aerosol-generating device 100 is selected. The selection is based on the release temperatures of the volatile compounds that should and should not be released. This predetermined value is then stored in the control unit 52. The control unit 52 includes a non-volatile memory 56.

The controller 30 controls the heating of the heater element 20 by controlling the supply electrical energy from the battery to the heater element 20. The controller 30 only allows for the supply of power to the heater element 20 if the aerosol-forming substrate detector 32 has detected an aerosol-forming substrate 20 and the user has activated the device. By the switching of switch 54, power is provided as a pulsed signal. The pulse width or duty cycle of the signal can be modulated by the control unit 52 to alter the amount of energy supplied to the heater element. In one embodiment, the duty cycle may be limited to 60-80%. This may provide additional safety and prevent a user from inadvertently raising the compensated temperature of the heater such that the substrate reaches a temperature above a combustion temperature.

In use, the controller 30 measures the resistivity ρ of the heater element 20. The controller 30 then converts the resistivity of the heater element 20 into a value for the actual operation temperature of the heater element, by comparing the measured resistivity ρ with the look-up table. This may be done within the measurement unit 50 or by the control unit 52. In the next step, the controller 30 compares the actual derived operation temperature with the target operation temperature. Alternatively, temperature values in the heating profile are pre-converted to resistance values so the controller regulates resistance instead of temperature, this avoids real-time computations to convert resistance to temperature during the smoking experience.

If the actual operation temperature is below the target operation temperature, then the control unit 52 supplies the heater element 20 with additional electrical energy in order to raise the actual operation temperature of the heater element 20. If the actual operation temperature is above the target operation temperature, the control unit 52 reduces the electrical energy supplied to the heater element 20 in order to lower the actual operation temperature back to the target operation temperature.

The control unit may implement any suitable control technique to regulate the temperature, such as a simple thermostatic feedback loop or a proportional, integral, derivative (PID) control technique.

The temperature of the heater element 20 is not only affected by the power being supplied to it. Airflow past the heater element 20 cools the heater element, reducing its temperature. This cooling effect can be exploited to detect changes in air flow through the device. The temperature of the heater element, and also its electrical resistance, will drop when air flow increases before the control unit 52 brings the heater element back to the target temperature.

Figure 3:
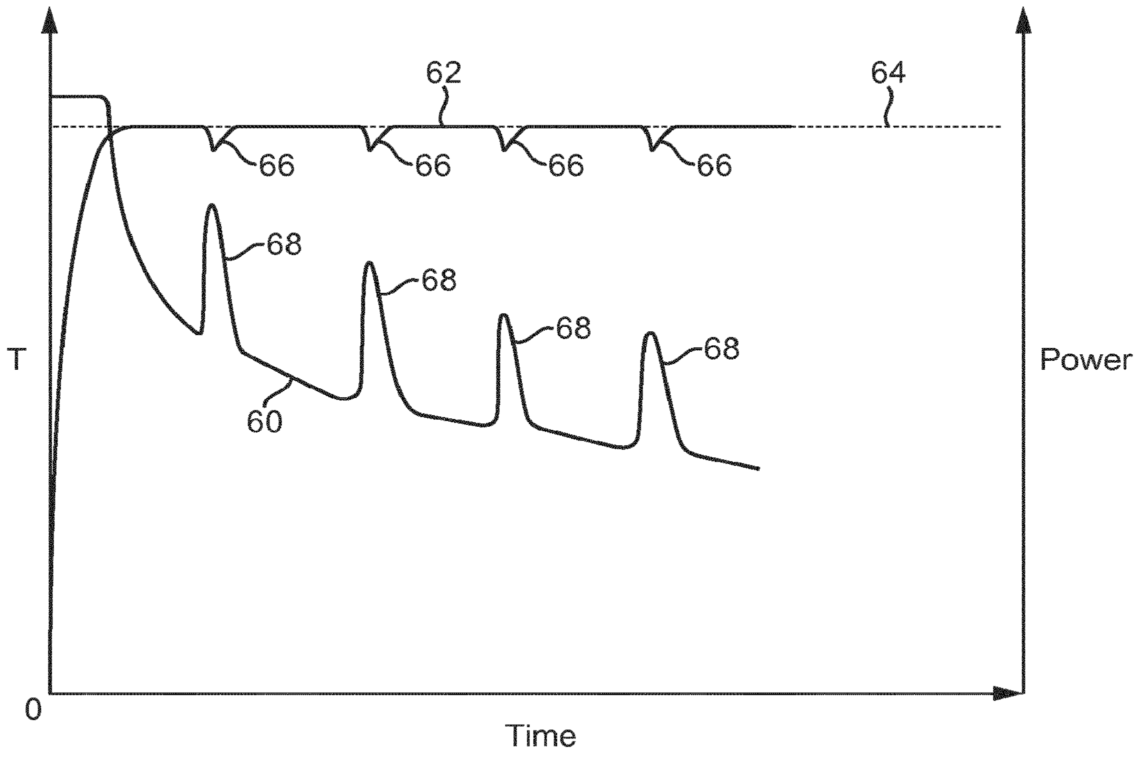
FIG. 3 is a graph illustrating changes in heater temperature and supplied power during user puffs in accordance with another embodiment.

FIG. 3 shows a typical evolution of heater element temperature and applied power during use of an aerosol generating device of the type shown in FIG. 1. The level of supplied power is shown as line 60 and the temperature of the heater element as line 62. The target temperature is shown as dotted line 64.

An initial period of high power is required at the start of use in order to bring the heater element up to the target temperature as quickly as possible. Once the target temperature has been reached the applied power drops to the level required to maintain the heater element at the target temperature. However, when a user puffs on the substrate 2, air is drawn past the heater element and cools it below the target temperature. This is shown as feature 66 in FIG. 3. In order to return the heater element 20 to the target temperature there is a corresponding spike in the applied power, shown as feature 68 in FIG. 3. This pattern is repeated throughout the use of the device, in this example a smoking session, in which four puffs are taken.

Figure 4:
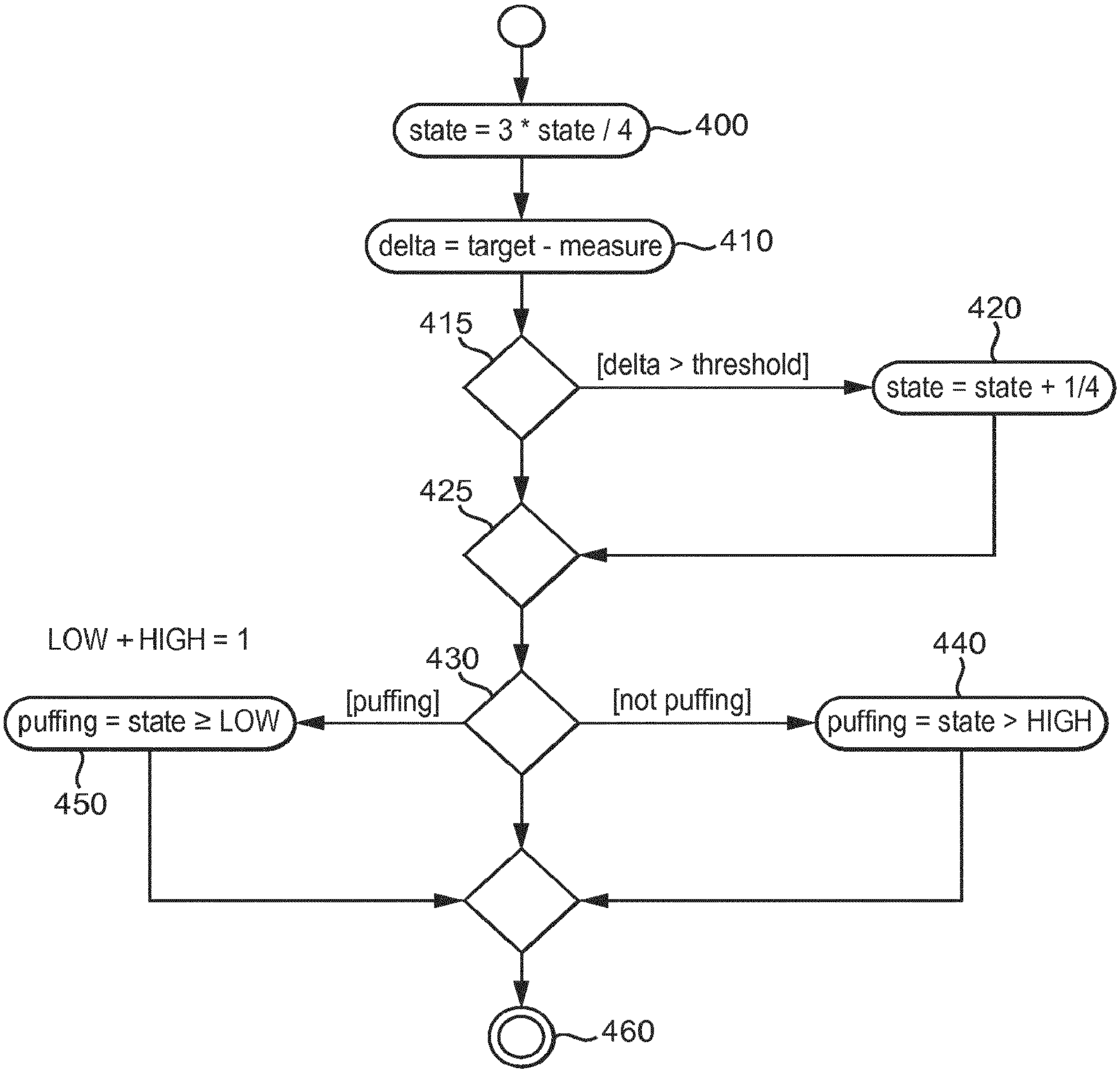
FIG. 4 illustrates a control sequence for determining if a user puff is taking place in accordance with an yet another embodiment.

By detecting temporary changes in temperature or power, or in the rate of change of temperature or power, user puffs or other airflow events can be detected. FIG. 4 illustrates an example of a control process, using a Schmitt trigger debounce approach, which can be used within control unit 52 to determine when a puff is taking place. The process in FIG. 4 is based on detecting changes in heater element temperature. In step 400 an arbitrary state variable, which is initially set as 0, is modified to three quarters of its original value. In step 410 a delta value is determined that is the difference between a measured temperature of the heater element and the target temperature. Steps 400 and 410 can be performed in reverse order or in parallel. In step 415 the delta value is compared with a delta threshold value. If the delta value is greater than the delta threshold then the state variable is increased by one quarter before passing to step 425. This is shown as step 420. If the delta value is less that the threshold the state variable is unchanged and the process moves to step 425. The state variable is then compared with a state threshold. The value of the state threshold used is different depending on whether the device is determined at that time to be in a puffing or not-puffing state. In step 430 the control unit determines whether the device is in a puffing or not-puffing state. Initially, i.e. in a first control cycle, the device is assumed to be in a not-puffing state.

If the device is in a not-puffing state the state variable is compared to a HIGH state threshold in step 440. If the state variable is higher than the HIGH state threshold then the device is determined to be in a puffing state. If not, it is determined to remain in a not-puffing state. In both cases, the process then passes to step 460 and then returns to 400.

If the device is in a puffing state the state variable is compared to a LOW state threshold in step 450. If the state variable is lower than the LOW state threshold then the device is determined to be in a not-puffing state. If not, it is determined to remain in a puffing state. In both cases, the process then passes to step 460 and then returns step to 400.

The value of the HIGH and LOW threshold values directly influence the number of cycles through the process are required to transition between not-puffing and puffing states, and vice versa. In this way very short term fluctuations in temperature and noise in the system, which are not the result of a user puff, can be prevented from being detected as a puff. Short fluctuations are effectively filtered out. However, the number of cycles required is desirably chosen so that the puff detection transition can take place before the device compensates for the drop in temperature by increasing the power delivered to the heater element. Alternatively the controller could suspend the compensation process while making the decision of whether a puff is taken or not. In one example LOW=0.06 and HIGH=0.94, which means that the system would need to go through at least 10 iterations when the delta value was greater than the delta threshold to go from not puffing to puffing.

The system illustrated in FIG. 4 can be used to provide a puff count and, if the controller includes a clock, an indication of the time at which each puff takes place. The puffing and not-puffing states can also be used to dynamically control the target temperature. Increased airflow brings more oxygen into contact with the substrate. This increases the likelihood of combustion of the substrate at a given temperature. Combustion of the substrate is undesirable. So the target temperature may be lowered when a puffing state is determined in order to reduce the likelihood of combustion of the substrate. The target temperature can then be returned to its original value when a not-puffing state is determined.

The process shown in FIG. 4 is just one example of a puff detection process. For example, similar processes to that illustrate in FIG. 4 could be carried out using applied power as a measure or using rate of change of temperature or rate of change of applied power. It is also possible to use a process similar to that shown in FIG. 4, but using only a single state threshold instead of different HIGH and LOW thresholds.

As well as being useful for dynamic control of the aerosol generating device, the puff detection data determined by the controller 30 may be useful for analysis purposes, for example, in clinical trials or in device maintenance and design processes. FIG. 2 illustrates connection of the controller 30 to an external device 58. The puff count and time data can be exported to the external device 58 (together with any other captured data) and may be further relayed from the device 58 to other external processing or data storage devices 60. The aerosol generating device may include any suitable data output means. For example the aerosol generating device may include a wireless radio connected to the controller 30 or memory 56, or a universal serial bus (USB) socket connected to the controller 30 or memory 56. Alternatively, the aerosol generating device may be configured to transfer data from the memory to an external memory in a battery charging device every time the aerosol generating device is recharged through suitable data connections. The battery charging device can provide a larger memory for longer term storage of the puff data and can be subsequently connected to a suitable data processing device or to a communications network. In addition, data as well as instructions for controller 30 may be uploaded, for example, to control unit 52 when controller 30 is connected to the external device 58.

Additional data may also be collected during operation of aerosol generating device 100 and transferred to the external device 58. Such data may include, for example, a serial number or other identifying information of the aerosol generating device; the time at start of smoking session; the time of the end of smoking session; and information related to the reason for ending a smoking session.

In one embodiment, a serial number or other identifying information, or tracking information, associated with the aerosol generating device 100 may be stored within controller 30. For example, such tracking information may be stored in memory 56. Because the aerosol generating device 100 may be not always be connected to the same external device 58 for charging or data transfer purposes, this tracking information can be exported to external processing or data storage devices 60 and gathered to provide a more complete picture of the user's behaviour.

It will now be apparent to one of ordinary skill in the art that knowledge of the time of the operation of the aerosol generating device, such as a start and stop of the smoking session, may also be captured using the methods and apparatuses described herein. For example, using the clock functionality of the controller 30 or the control unit 52, a start time of the smoking session may be captured and stored by controller 30. Similarly, a stop time may be recorded when the user or the aerosol generating device 100 ends the session by stopping power to the heater element 20. The accuracy of such start and stop times may further be enhanced if a more accurate time is uploaded to the controller 30 by the external device 58 to correct any loss or inaccuracy. For example, during a connection of the controller 30 to the external device 58, device 58 may interrogate the internal clock function of the controller 30, compare the received time value with a clock provided within external device 58 or one or more of external processing or data storage devices 60, and provide an updated clock signal to controller 30.

The reason for terminating a smoking session or operation of the aerosol generating device 100 may also be identified and captured. For example, control unit 52 may contain a look up table that includes various reasons for the end of the smoking session or operation. An exemplary listing of such reasons is provided here.

| Session code | Reason for session ending | Description of reason |
|---|---|---|
| 0 | (normal end) | End of session reached |
| 1 | (stop by user) | The user aborted the experience (by pushing power button to end session, by inserting aerosol generating device into the external device 58, or via a remote control command |
| 2 | (heater broken) | Suspected heater damage in view of temperature measurements outside of a predetermined range during heating |
| 3 | (incorrect heating level) | Malfunction occurs where heater element temperature overshoots or undershoots a predetermined operating temperature outside of an acceptable tolerance range |
| 4 | (external heating) | Heater element temperature remains higher than the target even if the supplied power is reduced |

The above table provides a number of exemplary reasons why operation or a smoking session may be terminated. It will now be apparent to one of ordinary skill in the art, by using various indications provided by the measurement unit 50 and the control unit 52 provided in the controller 30, either alone or in combination with recorded indications in response to the controller 30 control of the heating of the heater element 20, controller 30 may assign session codes with a reason for ending the operation of aerosol generating device 100 or a smoking session using such a device. Other reasons that may be determined from available data using the above described methods and apparatuses will now be apparent to one of ordinary skill in the art and may also be implemented using the methods and apparatuses described herein without deviating from the scope or spirit of this specification and the exemplary embodiments described herein.

Other data regarding a user operation of the aerosol generating device 100 may also be determined using the methods and apparatuses described herein. For example, the user's consumption of aerosol deliverables may be accurately approximated because the aerosol generating device 100 described herein may accurately control temperature of the heater element 20, and because data may be gathered by the controller 30, as well as the units 50 and 52 provided within the controller 30, an accurate profile of the actual use of the device 100 during a session can be obtained.

In one exemplary embodiment, the session data captured by the controller 30 can be compared to data determined during controlled sessions to even further enhance the understanding of the user use of the device 100. For example, by first collecting data using a smoking machine under controlled environmental conditions and measuring data such as the puff number, puffing volume, puff interval, and resistivity of heater element, a database can be constructed that provides, for examples, levels of nicotine or other deliverables provided under the experimental conditions. Such experimental data can then be compared to data collected by the controller 30 during actual use and be used to determine, for example, information on how much of a deliverable the user has inhaled. In one embodiment, such experimental data may be stored in one or more of devices 60 and additional comparison and processing of the data may take place in one or more of devices 60.

To the extent that additional environmental data is required to accurately compare actual user data and the experimental data, the control unit 52 may include additional functionality to provide such data. For example, the control unit 52 may include a humidity sensor or ambient temperature sensor and humidity data or ambient temperature data may be included as part of the data eventually provided to the external device 58. The usage of the device may also be analysed to determine which experimentally determined data most closely matches the usage behaviour, e.g. in terms of length and frequency of inhalation and number of inhalations. The experimental data with the most closely matching usage behaviour may then be used as the basis for further analysis and display.

It will now be apparent to one of ordinary skill in the art, that using the methods and apparatuses discussed herein, nearly any desired information may be captured by such that comparison to experimental data is possible and various attributes associated with a user's operation of the aerosol generating device 100 be accurately approximated.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. An aerosol-generating device, comprising:
a heater element;
a power source; and
a controller configured to:
control a power supplied from the power source to the heater element to maintain a temperature of the heater element at a target temperature, and
adjust the target temperature when a change in airflow past the heater element is detected.

2. The aerosol-generating device according to claim 1, wherein the controller is further configured to lower the target temperature when an increase in airflow past the heater element is detected.

3. The aerosol-generating device according to claim 1, wherein the controller is further configured to adjust the power supplied from the power source to the heater element when the change in airflow past the heater is detected.

4. The aerosol-generating device according to claim 1, wherein the controller is further configured to compare a rate of change of the temperature of the heater element, or a rate of change of power supplied to the heater element, with a threshold level to detect the change in air flow past the heater element.

5. The aerosol-generating device according to claim 1, wherein the controller is further configured to monitor the temperature of the heater element based on a measure of an electrical resistance of the heater element.

6. The aerosol-generating device according to claim 1, wherein the controller is further configured to monitor the temperature of the heater element only during periods when power is being supplied from the power source to the heater element.

7. The aerosol-generating device according to claim 1, wherein the power supplied from the power source to the heater element is adjusted by adjusting a duty cycle of the power supplied.

8. The aerosol-generating device according to claim 7, wherein the duty cycle of the power supplied is limited to a maximum duty cycle of 60%-80%.

9. The aerosol-generating device according to claim 1, wherein the heater element comprises an inductive heater element.

10. The aerosol-generating device according to claim 1, wherein the aerosol-generating device is an electrical smoking device.

11. The aerosol-generating device according to claim 1, wherein the change in airflow past the heater element is a result of a user inhalation.

12. An aerosol-generating system, comprising:
an aerosol-generating device according to claim 1; and
an aerosol-forming substrate,
wherein the heater element is configured to heat the aerosol-forming substrate.

13. The aerosol-generating system according to claim 12, wherein the aerosol-forming substrate is a solid aerosol-forming substrate.

14. The aerosol-generating system according to claim 12, wherein the heater element is further configured to directly contact the aerosol-forming substrate to heat the aerosol-forming substrate.

15. The aerosol-generating system according to claim 12, wherein the heater element is further configured to reach a temperature of at least 250 degrees Celsius to heat the aerosol-forming substrate.

16. The aerosol-generating system according to claim 12, wherein the aerosol-forming substrate is contained in a smoking article.

17. A method of controlling an aerosol-generating device, the aerosol-generating device comprising:
a heater element,
a power source, and
a controller; and
the method comprising:
controlling a power supplied from the power source to the heater element to maintain a temperature of the heater element at a target temperature, and
adjusting the target temperature when a change in airflow past the heater element is detected.

18. The method according to claim 17, wherein the step of adjusting the target temperature comprises or is a step of lowering the target temperature when an increase in airflow past the heater is detected.

19. The method according to claim 17, wherein the method further comprises adjusting the power supplied from the power source to the heater element when the change in airflow past the heater is detected.

20. The method according to claim 17, wherein method further comprises comparing a rate of change of the temperature of the heater element, or a rate of change of power supplied to the heater element, with a threshold level to detect the change in air flow past the heater element.

* * * * *